(12) United States Patent
Lyu et al.

(10) Patent No.: US 10,916,834 B2
(45) Date of Patent: Feb. 9, 2021

(54) CONDUCTIVE PLATE USED AS NEAR FIELD COMMUNICATION ANTENNA AND TERMINAL

(71) Applicant: Huawei Technologies Co., Ltd., Shenzhen (CN)

(72) Inventors: Shuwen Lyu, Shanghai (CN); Yuehui Ouyang, Santa Clara, CA (US); Xiaowei Zhang, Shanghai (CN); Bo Huang, Shanghai (CN); Wei Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 16/304,985

(22) PCT Filed: Dec. 7, 2016

(86) PCT No.: PCT/CN2016/108908
§ 371 (c)(1),
(2) Date: Nov. 27, 2018

(87) PCT Pub. No.: WO2017/206470
PCT Pub. Date: Dec. 7, 2017

(65) Prior Publication Data
US 2019/0326659 A1 Oct. 24, 2019

(30) Foreign Application Priority Data

May 28, 2016 (WO) ............... PCT/CN2016/083782
Jul. 8, 2016 (WO) ............... PCT/CN2016/089424

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 13/16* (2013.01); *H04M 1/0264* (2013.01); *H04M 1/0283* (2013.01)

(58) Field of Classification Search
CPC ...... H01Q 1/243; H01Q 13/10; H01Q 13/103; H01Q 13/106; H01Q 13/16
See application file for complete search history.

(56) References Cited

U.S. PATENT DOCUMENTS

| 6,346,914 B1 | 2/2002 | Annamaa | |
| 2009/0256757 A1* | 10/2009 | Chiang | ............... H01Q 1/2266 343/702 |

(Continued)

FOREIGN PATENT DOCUMENTS

| CN | 102074788 A | 5/2011 |
| CN | 103682619 A | 3/2014 |

(Continued)

OTHER PUBLICATIONS

Machine Translation and Abstract of Chinese Publication No. CN102074788, Dec. 16, 2015, 7 pages.
(Continued)

*Primary Examiner* — Daniel Munoz
(74) *Attorney, Agent, or Firm* — Conley Rose, P.C.

(57) ABSTRACT

A terminal includes a printed circuit board, a conductive plate, a near field communication antenna matching circuit and a near field communication chip, where a slot is disposed in the conductive plate, the conductive plate is provided with an opening at an end of the slot, a through-hole is disposed in the conductive plate, the through-hole communicates with the slot, a first electrical contact and a second electrical contact are disposed on two sides of the slot, respectively. The first electrical contact and the second electrical contact are disposed between the end of the slot and the through-hole, at least one of the first electrical (Continued)

contact or the second electrical contact is coupled to the near field communication antenna matching circuit, and a current corresponding to the near field communication frequency is formed at a periphery of the slot and at a periphery of the through-hole.

20 Claims, 16 Drawing Sheets

(51) Int. Cl.
  *H01Q 13/16* (2006.01)
  *H04M 1/02* (2006.01)

(56) References Cited

U.S. PATENT DOCUMENTS

| | | | |
|---|---|---|---|
| 2015/0009077 | A1 | 1/2015 | Lee et al. |
| 2015/0207223 | A1* | 7/2015 | Nakano .................. H01Q 1/243 343/702 |
| 2016/0112219 | A1 | 4/2016 | Lee et al. |
| 2016/0134730 | A1 | 5/2016 | Lee et al. |
| 2016/0352149 | A1* | 12/2016 | Jeong ...................... H02J 50/12 |

FOREIGN PATENT DOCUMENTS

| | | |
|---|---|---|
| CN | 104979625 A | 10/2015 |
| CN | 204885409 U | 12/2015 |
| CN | 105261834 A | 1/2016 |
| CN | 105451480 A | 3/2016 |
| CN | 105529531 A | 4/2016 |
| CN | 105591199 A | 5/2016 |

OTHER PUBLICATIONS

Machine Translation and Abstract of Chinese Publication No. CN103682619, Mar. 26, 2014, 8 pages.
Machine Translation and Abstract of Chinese Publication No. CN104979625, Oct. 14, 2015, 11 pages.
Machine Translation and Abstract of Chinese Publication No. CN105261834, Jan. 20, 2016, 10 pages.
Machine Translation and Abstract of Chinese Publication No. CN105451480, Mar. 30, 2016, 27 pages.
Machine Translation and Abstract of Chinese Publication No. CN204885409, Dec. 16, 2015, 13 pages.
Foreign Communication From a Counterpart Application, PCT Application No. PCT/CN2016/083782, International Search Report dated Feb. 8, 2017, 7 pages.
Foreign Communication From a Counterpart Application, PCT Application No. PCT/CN2016/083782, Written Opinion dated Feb. 8, 2017, 4 pages.
Foreign Communication From a Counterpart Application, PCT Application No. PCT/CN2016/089424, International Search Report dated Feb. 7, 2017, 7 pages.
Foreign Communication From a Counterpart Application, PCT Application No. PCT/CN2016/089424, Written Opinion dated Feb. 7, 2017, 4 pages.
Foreign Communication From a Counterpart Application, PCT Application No. PCT/CN2016/108908, English Translation of International Search Report dated Feb. 27, 2017, 2 pages.
Foreign Communication From a Counterpart Application, PCT Application No. PCT/CN2016/108908, English Translation of Written Opinion dated Feb. 27, 2017, 7 pages.

\* cited by examiner

CONDUCTIVE PLATE USED AS NEAR FIELD COMMUNICATION ANTENNA AND TERMINAL

CROSS-REFERENCE TO RELATED APPLICATIONS

This application is a U.S. National Stage of International Patent Application No. PCT/CN2016/108908 filed on Dec. 7, 2016, which lcaims priority to International Patent Application No. PCT/CN2016/083782 filed on Jul. 8, 2016 and international Patent Application No. PCT/CN2016/083782 filed on May 28, 2016. All of all aforementioned applications are hereby incorporated by reference in their entireties.

TECHNICAL FIELD

The present invention relates to the field of near field communications technologies, and in particular, to a conductive plate used as a near field communication antenna, and a terminal.

BACKGROUND

Near field communication (Near Field Communication, NFC) is a short-distance non-contact communications technology in which an operating frequency is 13.56 MHz and non-contact point-to-point data transmission between electronic devices is allowed for data exchange. Multiple service functions, such as electronic payment, identity authentication, ticketing, data exchange, anti-counterfeiting, advertising, and the like can be implemented by using the near field communications technology in combination with a mobile communications technology, so that an electronic consumption pattern of a user is gradually formed, and a new user consumption and service pattern is established.

However, in the prior art, an NFC antenna is usually disposed above a printed circuit board (Printed Circuit Board, PCB) during design of an electronic device supporting NFC (for example, a mobile phone). The NFC antenna needs to occupy separate space. In addition, to eliminate impact of eddy currents caused by the PCB board on the NFC antenna, ferrite further needs to be attached to one surface that is of the NFC antenna and that is close to the PCB board. This further enlarges space occupied by the designed NFC antenna, and also increases design costs.

SUMMARY

Embodiments of the present invention provide a conductive plate used as a near field communication antenna, and a terminal, so as to use a metal rear cover of the terminal as the NFC antenna, so that during design of the terminal, space occupied by the NFC antenna and costs are reduced.

According to a first aspect, an embodiment of the present invention provides a conductive plate used as a near field communication antenna. A first slot is disposed in the conductive plate, and the conductive plate is provided with an opening at an end of the first slot; a through-hole is further disposed in the conductive plate, and the through-hole communicates with the first slot; a first electrical contact and a second electrical contact are disposed on two sides of the first slot, respectively; the first electrical contact and the second electrical contact are disposed between the opening at the end of the first slot and the through-hole; at least one of the first electrical contact and the second electrical contact is connected to a near field communication antenna matching circuit; and a current corresponding to the near field communication frequency is formed at the periphery of the first slot and at the periphery of the through-hole.

With reference to the first aspect, in some possible implementations, the first electrical contact and the second electrical contact are symmetrically disposed on the two sides of the first slot.

With reference to the first aspect, in some possible implementations, both the first electrical contact and the second electrical contact are adjacent to the opening at the end of the first slot.

With reference to the first aspect, in some possible implementations, multiple through-holes are disposed in the conductive plate; and the multiple through-holes all communicate with the first slot from a same side of the first slot, or the multiple through-holes communicate with the first slot from the two sides of the first slot.

With reference to the first aspect, in some possible implementations, if the near field communication antenna matching circuit includes a first feeding end and a second feeding end, the first feeding end is connected to the first electrical contact, and the second feeding end is connected to the second electrical contact. If the near field communication antenna matching circuit includes a feeding end, one of the first electrical contact and the second electrical contact is connected to the feeding end, and the other of the first electrical contact and the second electrical contact is grounded.

With reference to the first aspect, in some possible implementations, the conductive plate 10 may further include a groove. The groove is disposed in a straight line in which the first slot is located, and a length of the groove is equal to a length of the conductive plate in the straight line, so that the groove and the first slot can be filled with a same insulation material.

In this embodiment of the present invention, a depth (for example, 0.02 cm) of at least a portion of the groove is less than a thickness (for example, 0.05 cm) of the conductive plate. That is, the groove is not entirely excavated to ensure continuity between the first electrical contact and the second electrical contact.

According to a second aspect, an embodiment of the present invention provides a terminal. The terminal includes a printed circuit board and a conductive plate disposed above the printed circuit board, where a near field communication antenna matching circuit and a near field communication chip are disposed on the printed circuit board; and the conductive plate may be the conductive plate described in the first aspect.

With reference to the second aspect, in some possible implementations, a through-hole in the conductive plate is configured to place a camera of the terminal or a fingerprint recognition button of the terminal.

With reference to the second aspect, in some possible implementations, to reduce a connecting resistance between a first electrical contact and the NFC antenna matching circuit, the first electrical contact may include at least two adjacent conductive springs arranged in parallel. Similarly, to reduce a connecting resistance between a second electrical contact and the NFC antenna matching circuit, the second electrical contact may also include at least two adjacent conductive springs arranged in parallel.

With reference to the second aspect, in some possible implementations, the conductive plate may be a rear cover of the terminal or a metal accessory attached on the rear cover.

With reference to the second aspect, in some possible implementations, the terminal device may further include an insulation layer, and the insulation layer is located between the conductive plate and the PCB board, so as to reduce impact of eddy currents caused by the PCB board on the conductive plate.

According to the terminal provided in the embodiments of the present invention, the metal rear cover of the terminal can be used as an NFC antenna of the terminal, so that during design of the terminal, space occupied by the NFC antenna and costs are reduced.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in the part of the implementations of the present invention are merely intended to explain specific embodiments of the present invention, but are not intended to limit the present invention.

Based on a prior-art problem, the embodiments of the present invention provide a terminal, so as to use a metal rear cover of the terminal as an NFC antenna, so that during design of the terminal, space occupied by the NFC antenna and costs are reduced. The following provides detailed descriptions with reference to the accompanying drawings.

Figure 1:
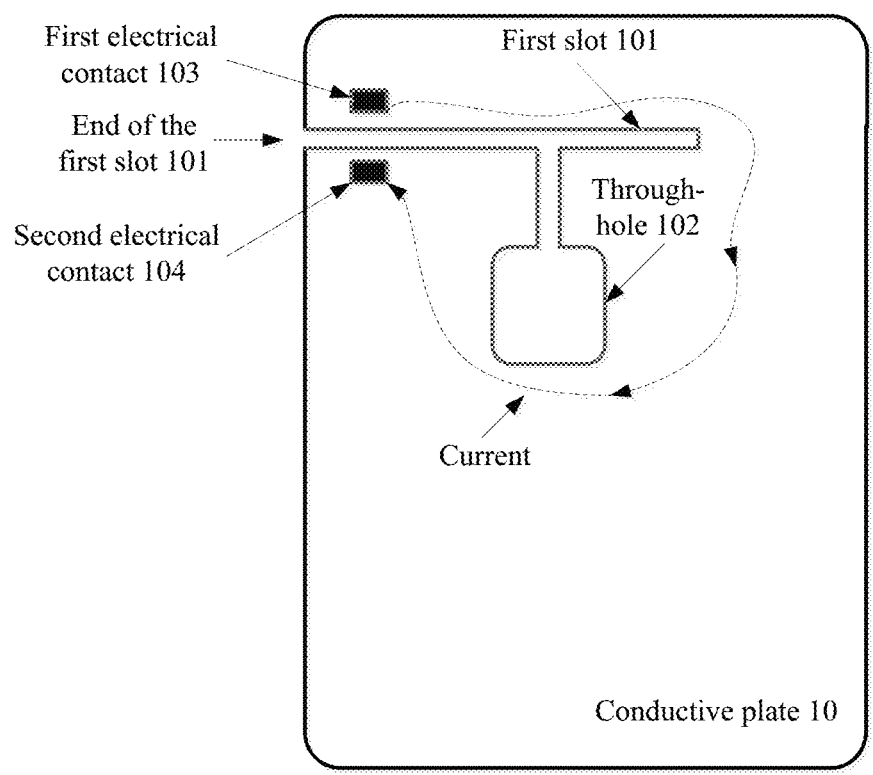
FIG. 1 is a schematic structural diagram of a first type of conductive plate according to an embodiment of the present invention.

Referring to FIG. 1, FIG. 1 is a schematic diagram of a conductive plate used as an NFC antenna according to an embodiment of the present invention. As shown in FIG. 1, a first slot 101 is disposed in the conductive plate 10, and the conductive plate 10 is provided with an opening at an end of the first slot 101. A through-hole 102 is further disposed in the conductive plate 10, and the through-hole 102 communicates with the first slot 101. A first electrical contact 103 and a second electrical contact 104 are disposed on two sides of the first slot 101, respectively. In addition, the first electrical contact 103 and the second electrical contact 104 are disposed between the end of the first slot 101 and the through-hole 102. At least one of the first electrical contact 103 and the second electrical contact 104 is connected to an NFC antenna matching circuit; and a current corresponding to a near field communication frequency (for example, an NFC operating frequency of 13.56 MHz) is formed at the periphery of the first electrical contact 103 and at the periphery of the through-hole 102.

Optionally, as shown in FIG. 1, the first electrical contact 103 and the second electrical contact 104 may be symmetrically disposed on the two sides of the first slot 101. In this way, the NFC antenna matching circuit is connected to a conductive spring of the first electrical contact 103 in a manner that is approximately same as that used when the NFC antenna matching circuit is connected to a conductive spring of the second electrical contact 104, and an output impedance from the NFC antenna matching circuit to the first electrical contact 103 is the same as that from the NFC antenna matching circuit to the second electrical contact 104.

Optionally, both the first electrical contact 103 and the second electrical contact 104 may be adjacent to the opening at the end of the first slot 101. In this way, more parts of a magnetic field generated by the current formed at the periphery of the first electrical contact 103 and at the periphery of the through-hole 102 can pass through the first slot 101.

Figure 3A:
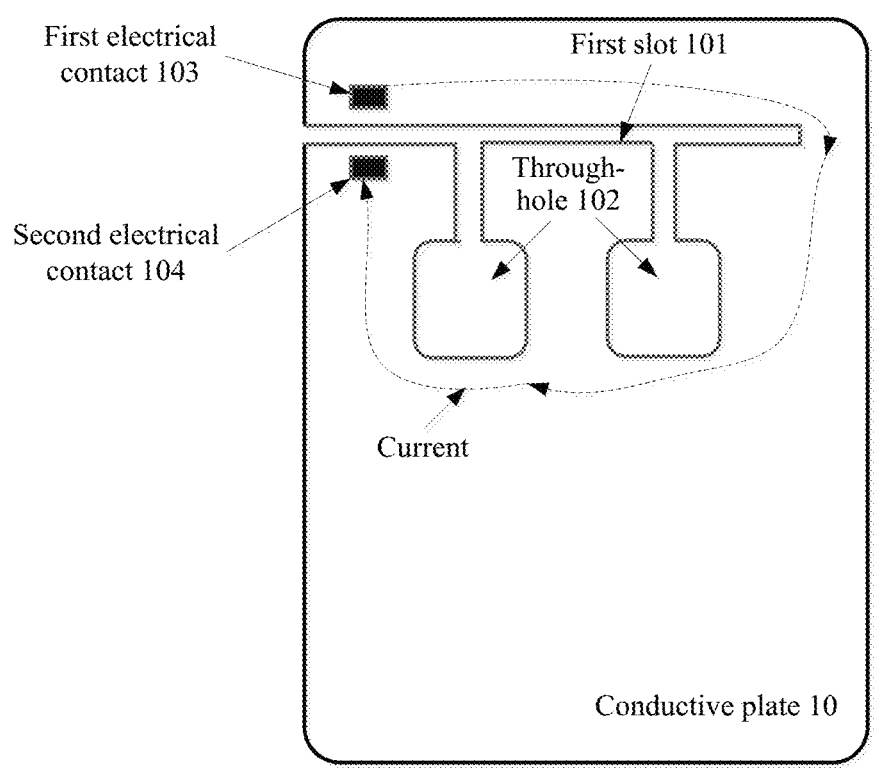
FIG. 3A is a schematic structural diagram of a second type of conductive plate according to an embodiment of the present invention.
Figure 3B:
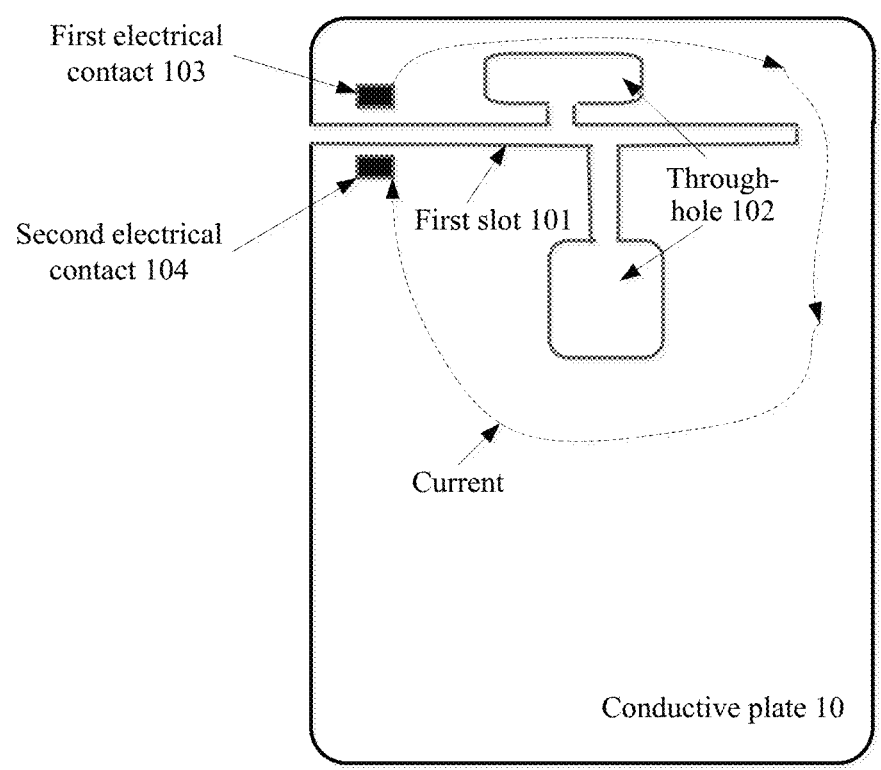
FIG. 3B is a schematic structural diagram of a third type of conductive plate according to an embodiment of the present invention.

Optionally, multiple (at least two) through-holes 102 may be disposed in the conductive plate 10. In one implementation, as shown in FIG. 3A, the multiple through-holes 102 all may communicate with the first slot 101 from a same side of the first slot 101. In another implementation, as shown in FIG. 3B, the multiple through-holes 102 may communicate with the first slot 101 from the two sides of the first slot 101. FIG. 3A and FIG. 3B are merely intended to explain this embodiment of the present invention, but should not be construed as a limitation.

In this embodiment of the present invention, at least one of the first electrical contact 103 and the second electrical contact 104 receives feeding of the NFC antenna matching circuit. Specifically, if the NFC antenna matching circuit includes a first feeding end and a second feeding end, the first feeding end is connected to the first electrical contact 103, and the second feeding end is connected to the second electrical contact 104. If the NFC antenna matching circuit includes only one feeding end, one of the first electrical contact 103 and the second electrical contact 104 is connected to the feeding end, and the other of the first electrical contact 103 and the second electrical contact 104 is grounded.

It should be understood that, because at least one of the first electrical contact 103 and the second electrical contact 104 receives feeding of the NFC antenna matching circuit, an electric potential difference exists between the first electrical contact 103 and the second electrical contact 104, and therefore a current can be formed. The first slot 101 and the through-hole 102 on the conductive plate 10 are hollow out and have a current blocking feature, so that a current between the first electrical contact 103 and the second electrical contact 104 flows at the periphery of the first slot 101 and at the periphery of the through-hole 102 on the conductive plate 10. This is equivalent to a ring current of the NFC antenna (as shown by a dashed line in the figure).

Figure 1A:
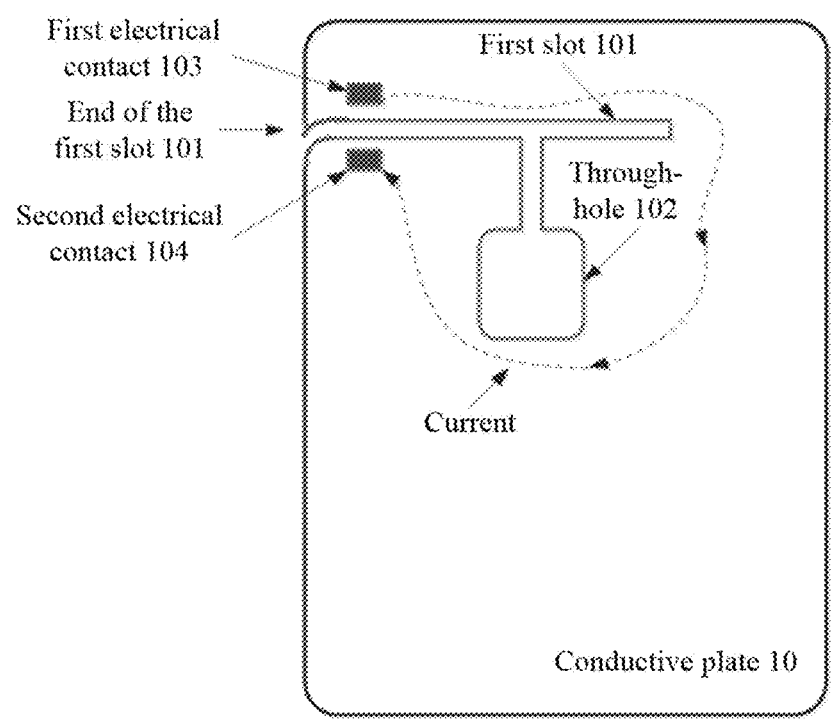
FIG. 1a is a schematic structural diagram of another conductive plate according to an embodiment of the present invention.

Optionally, the first slot 101 is in a bent shape, as shown in FIG. 1a. In this embodiment of the present invention, a main part of the first slot 101 is in a straight line shape, and at a position close to the end of the first slot 101, the first slot 101 is in a bent shape. Optionally, the first slot 101 may further include more bent parts.

Figure 2:
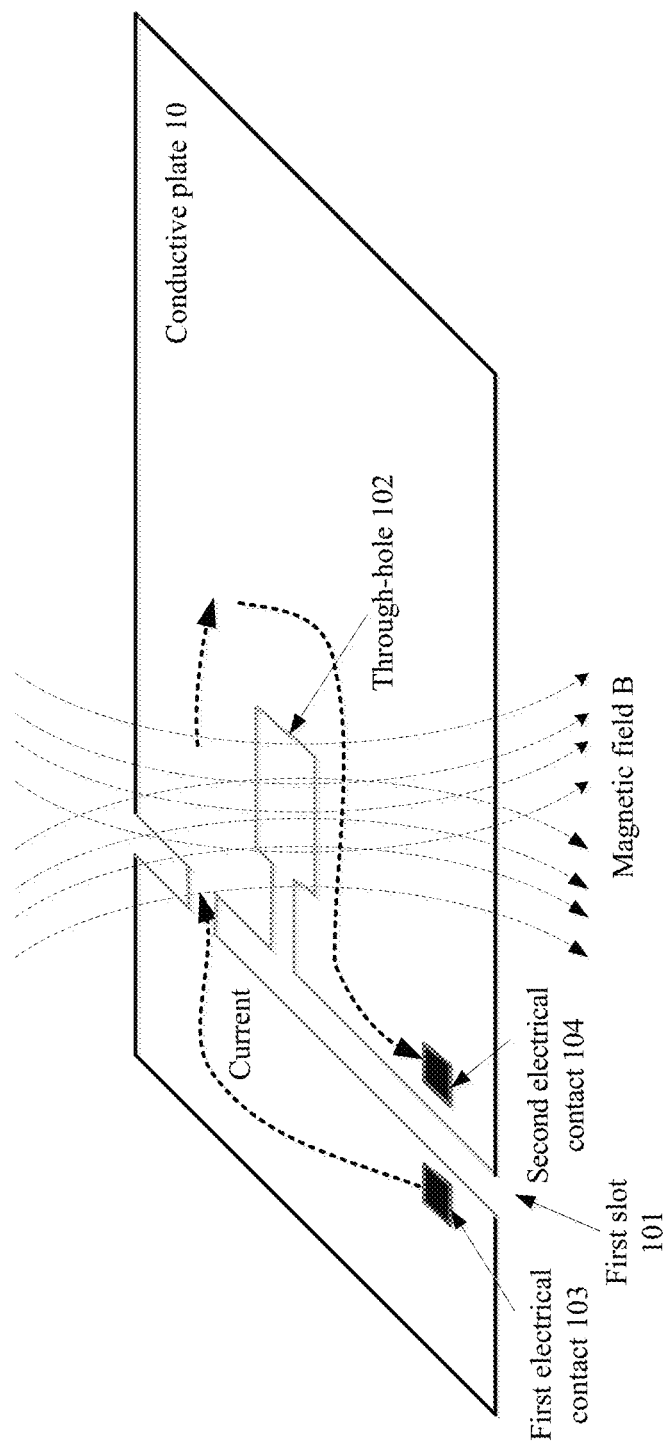
FIG. 2 is a schematic diagram of an electromagnetic effect generated by a conductive plate according to an embodiment of the present invention.

In this embodiment of the present invention, an electromagnetic effect generated by the conductive plate 10 used as the NFC antenna may be shown in FIG. 2.

It should be noted that a direction of the current between the first electrical contact 103 and the second electrical contact 104 may be a counterclockwise direction in addition to a clockwise direction shown in the figure. It can be learned from Ampere's law (that is, the right-hand screw rule) that: if a direction of a current on the conductive plate 10 is a clockwise direction, a direction of a magnetic field passing through the first slot 101 and the through-hole 102 may be shown in FIG. 2, that is, pointing inward to a plane in which the conductive plate 10 is located; or if a direction of a current on the conductive plate 10 is a counterclockwise direction, a direction of a magnetic field passing through the first slot 101 and the through-hole 102 may be pointing outward to a plane in which the conductive plate 10 is located.

It should be noted that a slotting position, shown in FIG. 1, of the first slot 101 is merely one implementation of this embodiment of the present invention. In actual application, alternatively, the slotting position of the first slot 101 may be on another side of the conductive plate 10. A slotting direction of the first slot 101 is also not limited by FIG. 1, but may be any direction, for example, a diagonal direction of the conductive plate 10.

In this embodiment of the present invention, the conducive plate 10 shown in FIG. 1 may be a conductive rear cover (such as a metal rear cover) of the terminal device (such as a mobile phone), or a conductive accessory (such as a metal accessory) on a rear cover of the terminal device. The through-hole 102 in the conductive plate 10 may be used to place a camera, a fingerprint sensor, or another component of the terminal device. A position of the through-hole 102 is not limited by FIG. 1, and may be on the other side of the first slot 101. A shape of the through-hole 102 is not limited by FIG. 1, and may be determined according an actual requirement.

Figure 4:
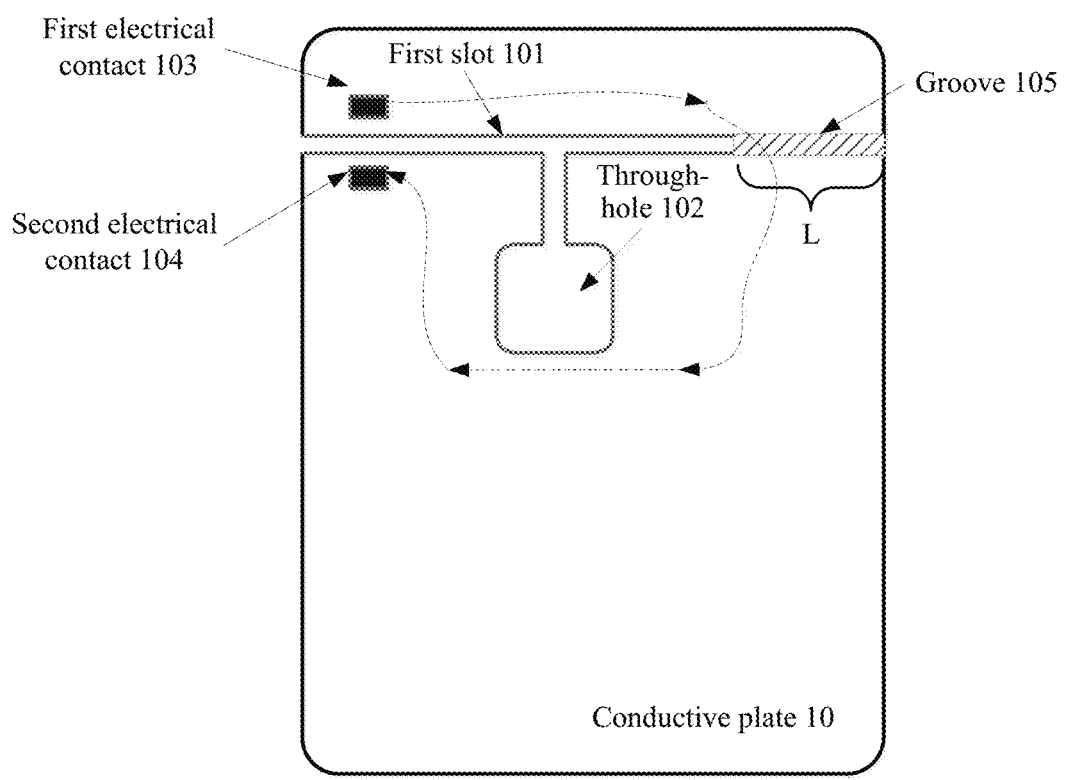
FIG. 4 is a schematic structural diagram of a fourth type of conductive plate according to an embodiment of the present invention.

In this embodiment of the present invention, the conductive plate 10 may further include a groove 105, as shown in FIG. 4. The groove 105 is disposed in a straight line in which the first slot 101 is located, and a length of the groove 105 is equal to a length (such as a length L in FIG. 4) of the conductive plate 10 in the straight line. Therefore, the groove 105 and the first slot 101 may be filled with a same insulation material to make the groove 105 and the first slot 101 keep a same appearance. For example, if the conductive plate 10 is a metal plate, the groove 105 and the first slot 101 may be filled with metal oxide, so as to keep an appearance the same as that of peripheral metal.

Figure 5:
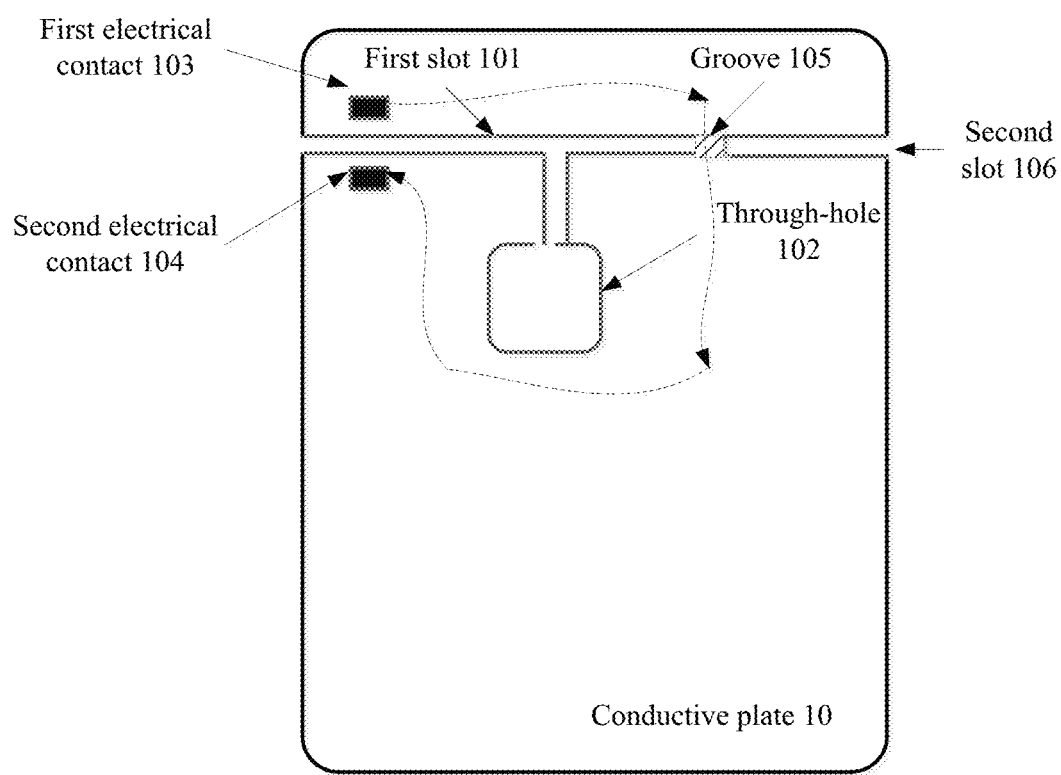
FIG. 5 is a schematic structural diagram of a fifth type of conductive plate according to an embodiment of the present invention.

In this embodiment of the present invention, a depth (for example, 0.02 cm) of at least a portion of the groove 105 is less than a thickness (for example, 0.05 cm) of the conductive plate 10. That is, the groove 105 is not entirely excavated to ensure continuity between the first electrical contact 103 and the second electrical contact 104. For example, as shown in FIG. 5, a part that is of the groove 105 and that is far from the first slot 101 may be excavated, that is, a depth of the part that is of the groove 105 and that is far from the first slot 101 is equal to the thickness of the conductive plate 10, so as to form a new slot, that is, a second slot 106. FIG. 5 is merely intended to explain this embodiment of the present invention, but should not be construed as a limitation.

Figure 5A:
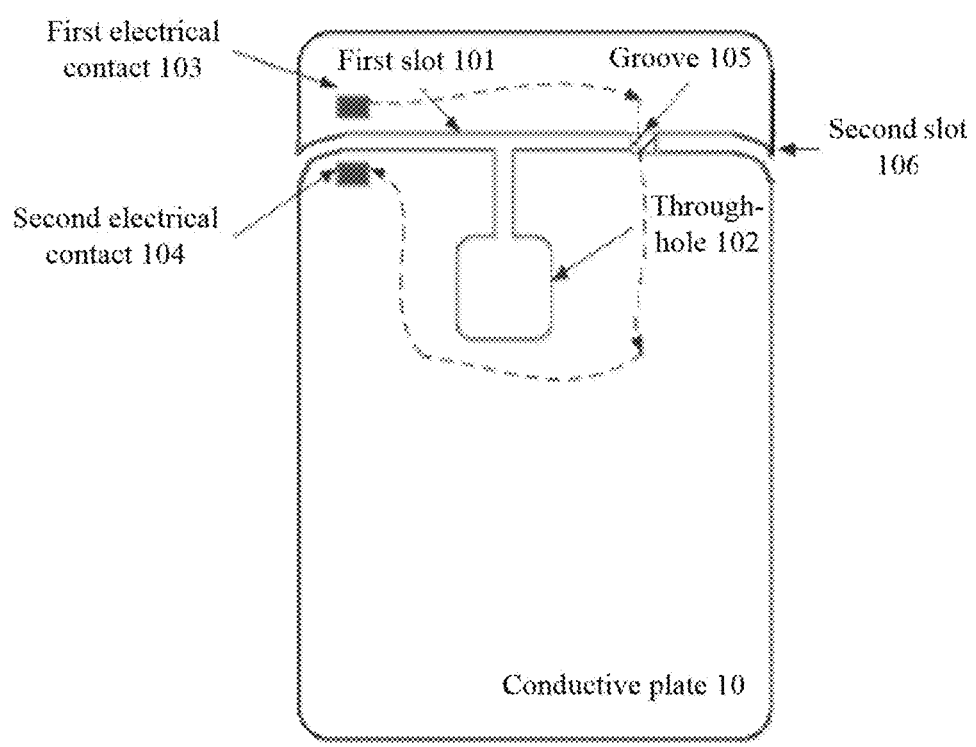
FIG. 5a is a schematic structural diagram of another conductive plate according to an embodiment of the present invention.

Optionally, the first slot 101 and the second slot 106 are in a bent shape. Refer to FIG. 5a. In this embodiment of the present invention, a main part of the first slot 101 is in a straight line shape, and at a position close to the end of the first slot 101, the first slot 101 is in a bent shape. A main part of the second slot 106 is in a straight line shape, and at a position close to an end of the second slot 106, the second slot 106 is in a bent shape. The first slot 101 and the second slot 106 are U-shaped as a whole. Optionally, the first slot 101 and the second slot 106 may alternatively in more shapes.

Optionally, a height of the conductive plate on which the first electrical contact 103 is located is close to 0. That is, the conductive plate on which the first electrical contact 103 is located mainly uses a metal bezel at the top of the terminal device.

The following describes in detail a terminal device to which a conductive plate 10 is applied.

Figure 6:
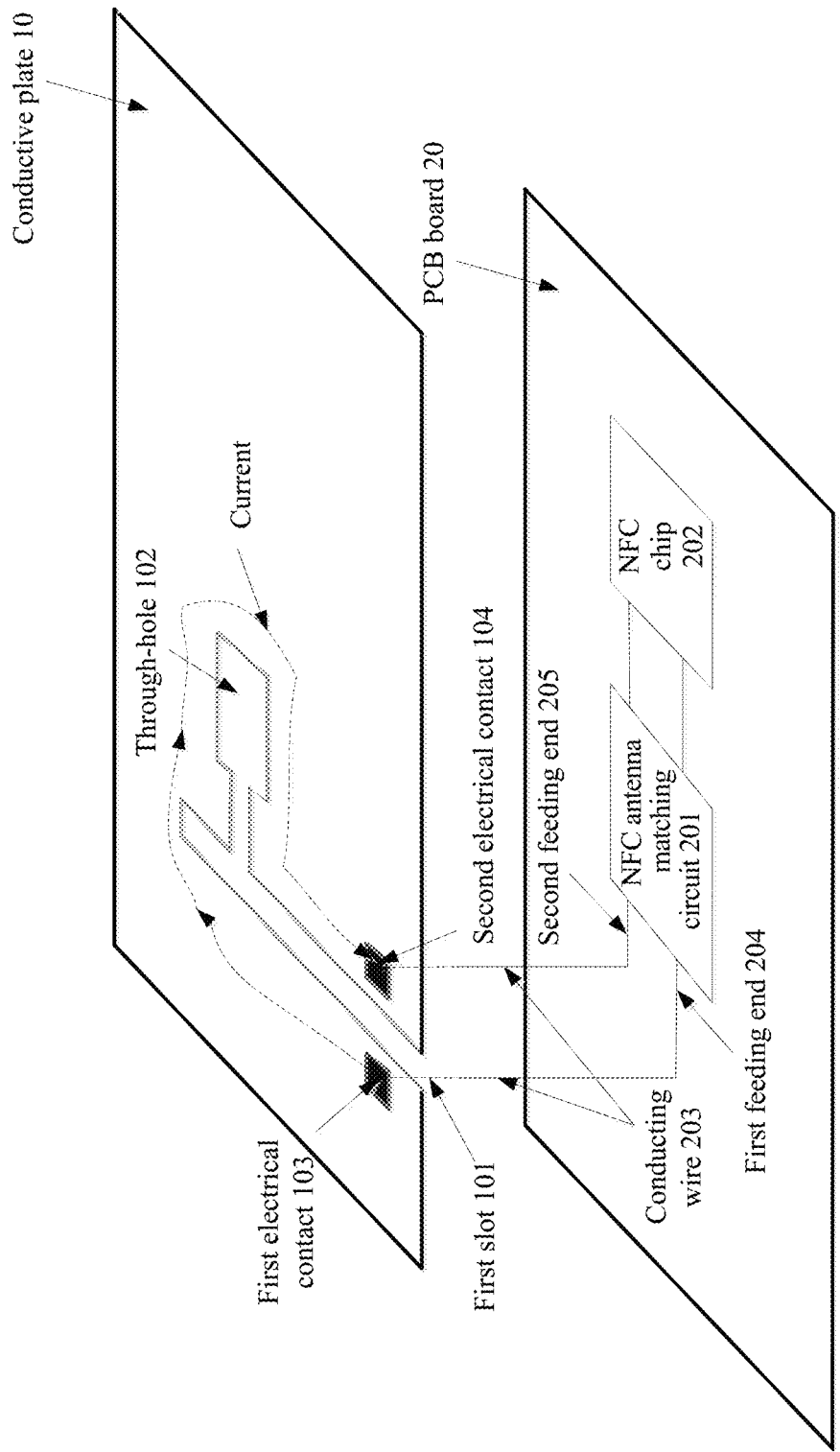
FIG. 6 is a schematic structural diagram of a terminal device according to an embodiment of the present invention.

Referring to FIG. 6, FIG. 6 is a schematic diagram of a terminal device to which a conductive plate 10 is applied according to an embodiment of the present invention. The terminal device supports NFC communication. As shown in FIG. 6, the terminal device includes a PCB board 20 and the conductive plate 10 disposed above the PCB board 20. An NFC antenna matching circuit 201 and an NFC chip 202 are disposed on the PCB board 20, and the conductive plate 10 may be the conductive plate 10 described in the embodiments corresponding to FIG. 1 to FIG. 5, respectively.

In an implementation shown in FIG. 6, the NFC antenna matching circuit 201 includes two feeding ends: a first feeding end 204 and a second feeding end 205. The first feeding end 204 is connected to a first electrical contact 103, and the second feeding end 205 is connected to a second electrical contact 104, so as to send, to both the first electrical contact 103 and the second electrical contact 104, a differential signal output by the NFC chip 202.

Figure 7:
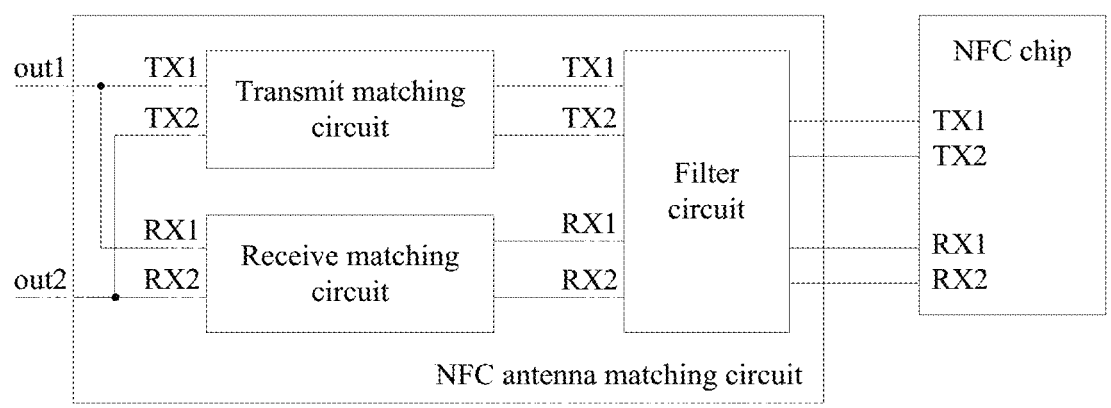
FIG. 7 is a schematic modular diagram of an NFC antenna matching circuit according to an embodiment of the present invention.

Specifically, in the implementation shown in FIG. 6, the NFC antenna matching circuit 201 may include a filter circuit, a transmit matching circuit, and a receive matching circuit, as shown in FIG. 7. In actual application, some circuits and modules may be added to or removed from the NFC antenna matching circuit 201 according to specific application requirements. This is not limited herein. For example, if the terminal device has only an NFC transmit function, the receive matching circuit in FIG. 7 may be removed from the NFC antenna matching circuit 201. Optionally, the filter circuit may be simplified to perform filtering processing on only opposite-phase transmit signals output by transmit pins (Tx1 and Tx2) of the NFC chip 202. For another example, if the terminal device has only an NFC read function, the transmit matching circuit in FIG. 7 may be removed from the NFC antenna matching circuit 201. Optionally, the filter circuit may be simplified to perform filtering processing on only two opposite-phase signals input to receive pins (Rx1 and Rx2) of the NFC chip 202.

In specific implementation, the first electrical contact 103, the second electrical contact 104, and the NFC antenna matching circuit 201 may be connected with each other in a manner of using a metal spring, a metal probe, or the like. That is, a conducting wire 203 in FIG. 6 may be a conductive component, such as a metal spring, a metal probe, or the like.

It should be understood that the conducting wire 203 may be equivalent to a resistor when the NFC antenna matching circuit provides feeding to the first electrical contact 103 and the second electrical contact 104. To reduce a resistance formed by the conducting wire 203, the first electrical contact 103 may include at least two conductive components (for example, metal springs) arranged in parallel, and the second electrical contact 104 may also include at least two conductive components (for example, metal springs) arranged in parallel.

Figure 8:
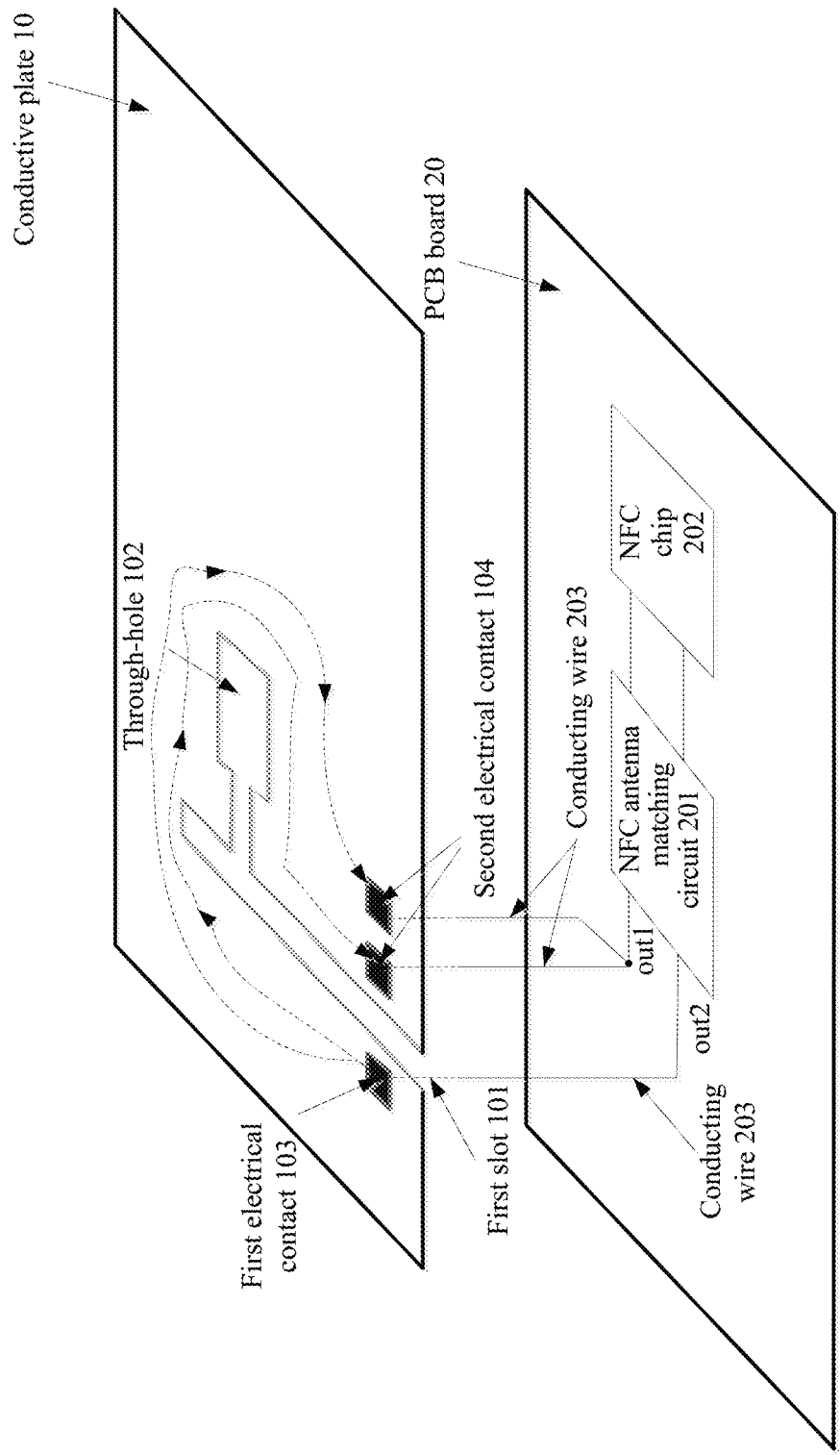
FIG. 8 is a schematic structural diagram illustrating that multiple feeding ends of an NFC antenna are arranged in parallel according to an embodiment of the present invention.

For example, as shown in FIG. 8, FIG. 8 shows an implementation in which the second electrical contact 104 includes two conductive components arranged in parallel. It can be understood that, in the implementation shown in FIG. 8, a connecting resistance between the second electrical contact 104 and the NFC antenna matching circuit 201 can be reduced, so that the current between the first electrical contact 103 and the second electrical contact 104 is increased, and strength of a magnetic field generated by the conductive plate 10 is enhanced.

It should be noted that the example is merely one implementation of this embodiment of the present invention, and should not be construed as a limitation. In actual application, an electrical contact formed on the conductive plate 10 by the at least two conductive components that are arranged in parallel and that constitute the second electrical contact 104 may be arranged preferably along a first slot 101, so as to reduce a shielding effect of the conductive plate 10 on the magnetic field and make more magnetic field lines pass through the first slot 101 and a through-hole 102.

The first electrical contact 103 may alternatively include at least two adjacent electrical contacts arranged in parallel. For an implementation thereof, reference may be made to content related to the second electrical contact 104. Details are not described herein again.

Figure 9:
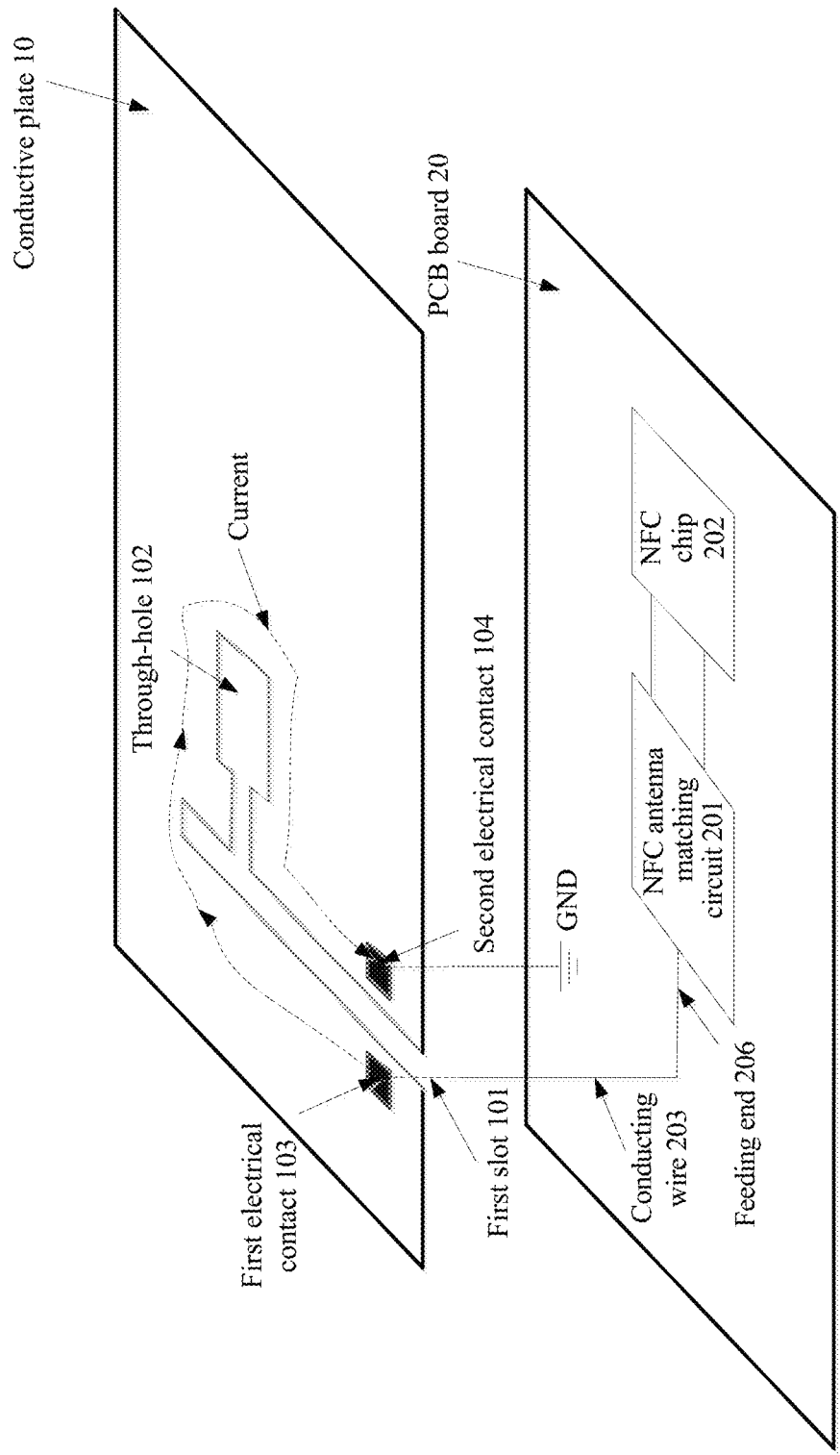
FIG. 9 is a schematic structural diagram of another terminal device according to an embodiment of the present invention.

Referring to FIG. 9, FIG. 9 is a schematic diagram of another terminal device to which a conductive plate 10 is applied according to an embodiment of the present invention. As shown in FIG. 9, the terminal device includes a PCB board 20 and the conductive plate 10 disposed above the PCB board 20. An NFC antenna matching circuit 201 and an NFC chip 202 are disposed on the PCB board 20, and the conductive plate 10 may be the conductive plate 10 described in the embodiments corresponding to FIG. 1 to FIG. 5, respectively.

In an implementation shown in FIG. 9, the NFC antenna matching circuit 201 includes only one feeding end 206. One of a first electrical contact 103 and a second electrical contact 104 (for example, the first electrical contact 103 shown in the figure) is connected to the feeding end 206, and the other of the first electrical contact 103 and the second electrical contact 104 (for example, the second electrical contact 104 shown in the figure) is grounded.

It should be noted that this is not limited to the example in FIG. 9. One electrical contact that is of the first electrical contact 103 and the second electrical contact 104 and that is connected to the feeding end 206 may alternatively be the second electrical contact 104, and the first electrical contact 103 is grounded.

Figure 10:
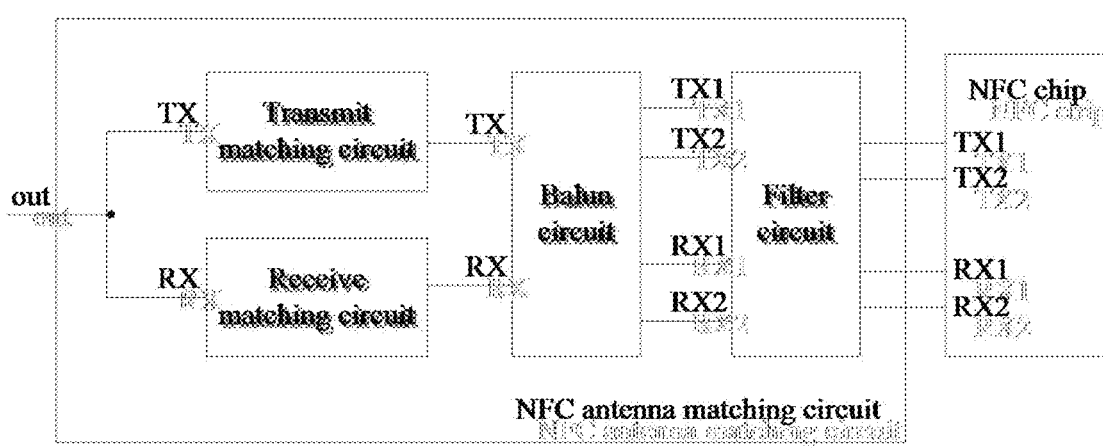
FIG. 10 is a schematic modular diagram of another NFC antenna matching circuit according to an embodiment of the present invention.

Specifically, in the implementation shown in FIG. 9, the NFC antenna matching circuit 201 may include a filter circuit, a balun circuit, a transmit matching circuit, and a receive matching circuit, as shown in FIG. 10. The balun circuit is used for mutual conversion between a differential signal and a single-ended signal.

Specifically, when the terminal device externally transmits an NFC signal by using the conductive plate 10, the balun circuit is used to convert opposite-phase differential signals output by transmit pins (Tx1 and Tx2) of the NFC chip 202 into a single-ended signal, so that the NFC antenna matching circuit 201 sends the single-ended signal to one electrical contact that is of the first electrical contact 103 and the second electrical contact 104 and that is connected to the NFC antenna matching circuit 201 (for example, the first electrical contact 103 shown in the figure). When the terminal device receives an external NFC signal by using the conductive plate 10, the balun circuit is used to convert a single-ended signal output by the receive matching circuit into two opposite-phase differential signals, so that the NFC antenna matching circuit 201 outputs the two opposite-phase differential signals to receive pins (Rx1 and Rx2) of the NFC chip.

It should be noted that, in actual application, the balun circuit shown in FIG. 10 may alternatively be two independent balun circuit units. One balun circuit unit may be used to convert differential signals output by the transmit pins (Tx1 and Tx2) of the NFC chip 202 into a single-ended signal, and the other balun circuit unit may be used to convert a single-ended signal output by the receive matching circuit into a differential signal.

It should be noted that, in actual application, the NFC antenna matching circuit 201 may add and remove some circuits and modules may be added to or removed from the NFC antenna matching circuit 201 according to specific application requirements. This is not limited herein. For example, if the terminal device has only an NFC transmit function, the receive matching circuit in FIG. 10 may be removed from the NFC antenna matching circuit 201. Optionally, the balun circuit may be simplified to convert only opposite-phase differential signals output by the transmit pins (Tx1 and Tx2) of the NFC chip 202 into a single-ended signal. Optionally, the filter circuit may be simplified to perform filtering processing on only opposite-phase transmit signals output by the transmit pins (Tx1 and Tx2) of the NFC chip 202. For another example, if the terminal device has only an NFC read function, the transmit matching circuit in FIG. 10 may be removed from the NFC antenna matching circuit 201. Optionally, the balun circuit may be simplified to only convert a single-ended signal output by the receive matching circuit into two opposite-phase differential signals. Optionally, the filter circuit may be simplified to perform filtering processing on only two opposite-phase differential signals input to the receive pins (Rx1 and Rx2) of the NFC chip 202.

In this embodiment of the present invention, the first electrical contact 103 may include at least two conductive components (for example, metal springs) arranged in parallel, and the second electrical contact 104 may also include at least two conductive components (for example, metal springs) arranged in parallel. For details, reference may be made to the related content in the embodiments shown in FIG. 8 and FIG. 6, and details are described herein again.

In the implementation shown in FIG. 6 or FIG. 9 according to this embodiment of the present invention, the terminal device may further include an insulation layer, and the insulation layer is located between the conductive plate 10 and the PCB board 20, so as to reduce impact of eddy currents caused by the PCB board 20 on the conductive plate 10.

In this embodiment of the present invention, a slotting length of a first slot 101 and an area of a through-hole 102 may be set according to actual requirements. For example, the through-hole 102 is a circle with a diameter of around 1 cm or a quadrate with a perimeter of around 1 cm, and a shape of the through-hole may alternatively be an ellipse, a triangle, an irregular shape, or the like, so as to adjust performance of an NFC antenna of the terminal device.

In this embodiment of the present invention is implemented, an inductance value of the NFC antenna may be increased by using an inductor connected to the first electrical contact or the second electrical contact in series, so that the NFC antenna formed by the conductive plate 10 has a longer working distance.

Figure 9A:
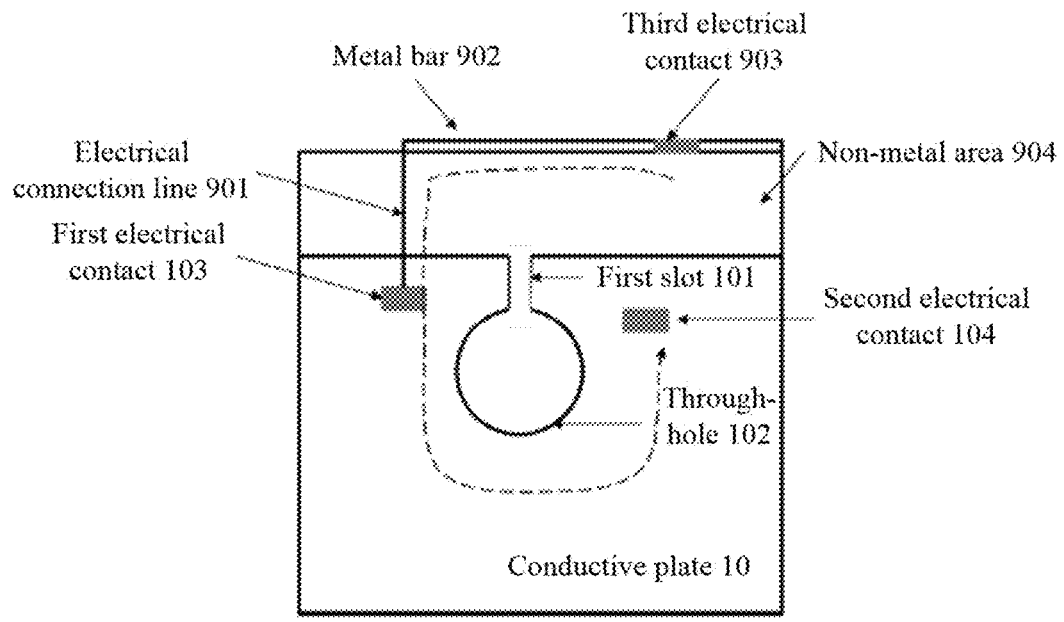
FIG. 9a is a schematic structural diagram of another terminal device according to an embodiment of the present invention.

FIG. 9a shows a schematic structural diagram of another terminal device. This is different from the embodiment shown in FIG. 6 or FIG. 9 in which the first electrical contact 103 is directly connected to the first feeding end 204 or the feeding end 206. In this embodiment of the present invention, the first electrical contact 103 is connected to the first feeding end 204 or the feeding end 206 by using a metal bar 902 (referring to FIG. 6 or FIG. 9). Specifically, the first feeding end 204 or the feeding end 206 is connected to a third electrical contact 903, the third electrical contact 903 is disposed on the metal bar 902, and the third electrical contact 903 and the first electrical contact 103 are disposed on two sides of the first slot 101. A non-metal area 904 is disposed between the metal bar 902 and the conductive plate 10. The metal bar 902 is connected to the first electrical contact 103 by using an electrical connection line 901. The electrical connection line 103 is across the non-metal area 904. The conductive plate 10 may be a part of a rear cover of the terminal device. The rear cover of the terminal device includes a part of the non-metal area 904, and the non-metal area 904 may be a glass rear cover or a plastic rear cover. Alternatively, the conductive plate 10 is disposed inside the terminal device, and the terminal device further includes a non-conductive rear cover. The metal bar 902 may be a flexible circuit board, a terminal metal bezel, or the like. The electrical connection line 901 may be a conducting wire or a spring, and be partially disposed on a printed circuit board. The electrical connection line 901 may seem seamlessly connected to the metal bar 902. The second electrical contact 104 is connected to the other feeding end (for example, the second feeding end 205) of the NFC antenna matching circuit, or is grounded. A current path of an NFC signal is shown by a dashed line in the figure, that is, from the third electrical contact 903, along the metal bar 902, the electrical connection line 901, and the first electrical contact 103, to the second electrical contact 104. A current path on the conductive plate 10 bypasses the first slot 101 and the through-hole 102. The first slot 101 may be filled with a material the same as that in the non-metal area 904, and the through-hole 102 may be filled with a material the same as that in the non-metal area 904. For related content, reference may be made to other embodiments, and details are not described herein again.

Figure 9B:
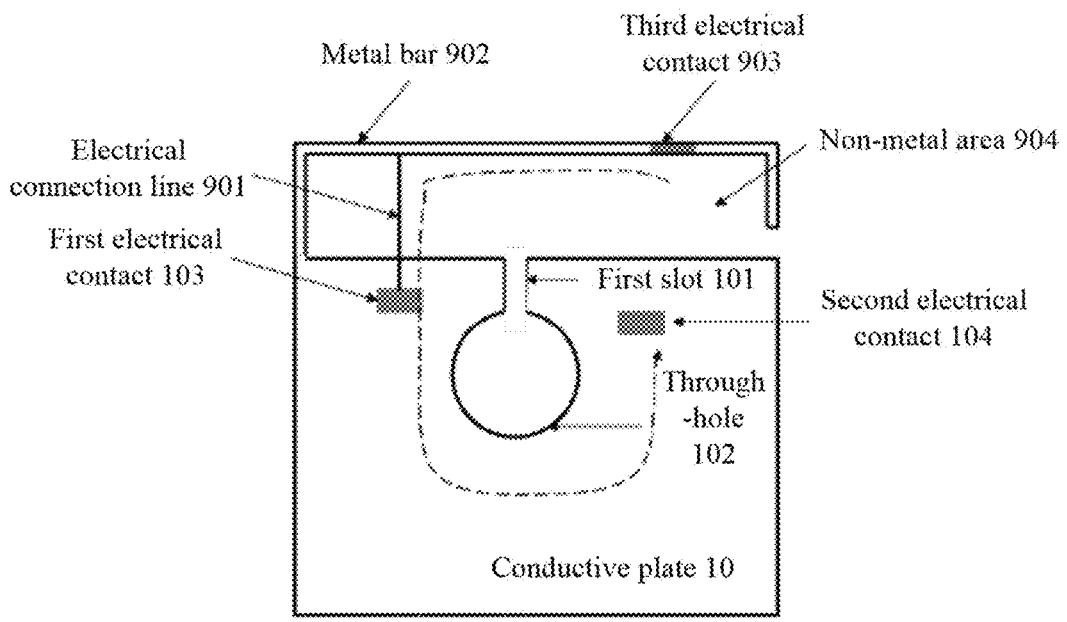
FIG. 9b is a schematic structural diagram of another terminal device according to an embodiment of the present invention.

FIG. 9b is a schematic structural diagram of another terminal. Compared with FIG. 9a, in this embodiment of the present invention, the metal bar 902 is directly connected to the conductive plate 10, and the connection position and the third electrical contact 903 are at the two sides of the first slot 101.

Figure 9C:
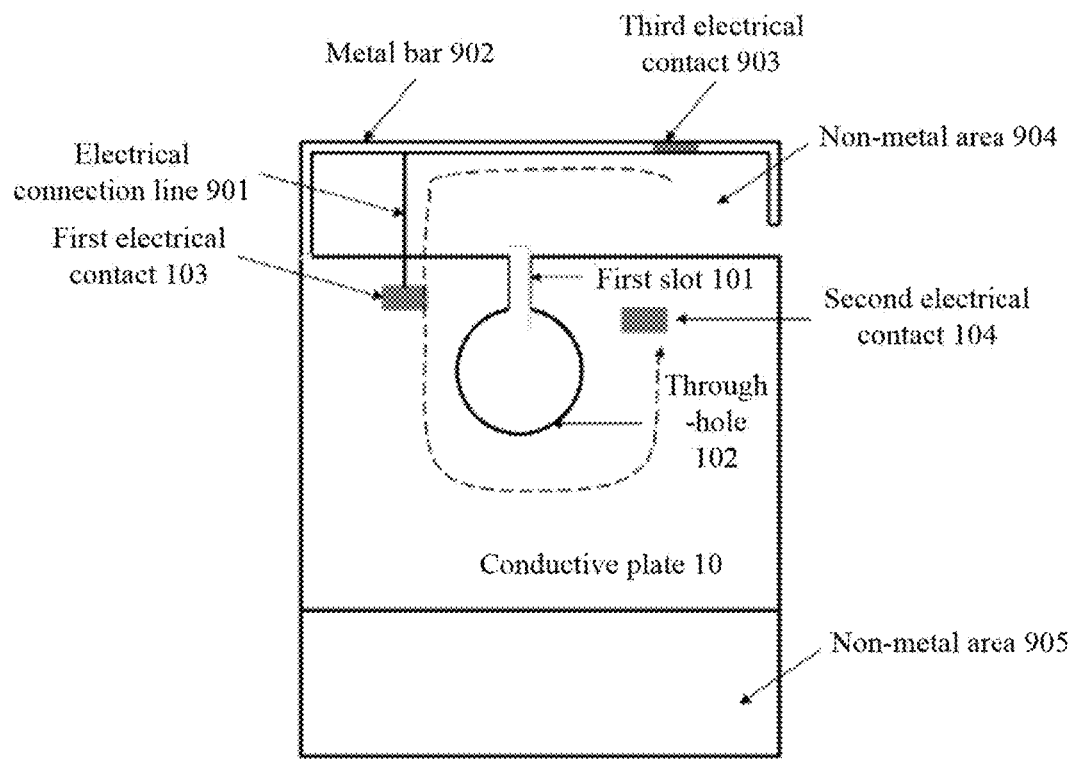
FIG. 9c is a schematic structural diagram of another terminal device according to an embodiment of the present invention.

It can be understood that another non-metal area may be disposed around the conductive plate 10, for example, a non-metal area 905 in FIG. 9c. The non-metal area 904 may use glass, plastic, or a like material.

In addition to an NFC antenna, a smart terminal device is generally provided with another wireless communications antenna, for example, a WiFi (Wireless-Fidelity, Chinese: Wireless Fidelity) antenna, a GPS (Global Positioning System, Chinese: Global Positioning System) antenna, and a Bluetooth antenna. Communication frequencies of these antennas are relatively high. To reduce space occupied by multiple types of wireless communications antennas, the NFC antenna provided in this embodiment of the present invention may share a feeding end with another high-frequency antenna (for example, a WiFi antenna).

Figure 11A:
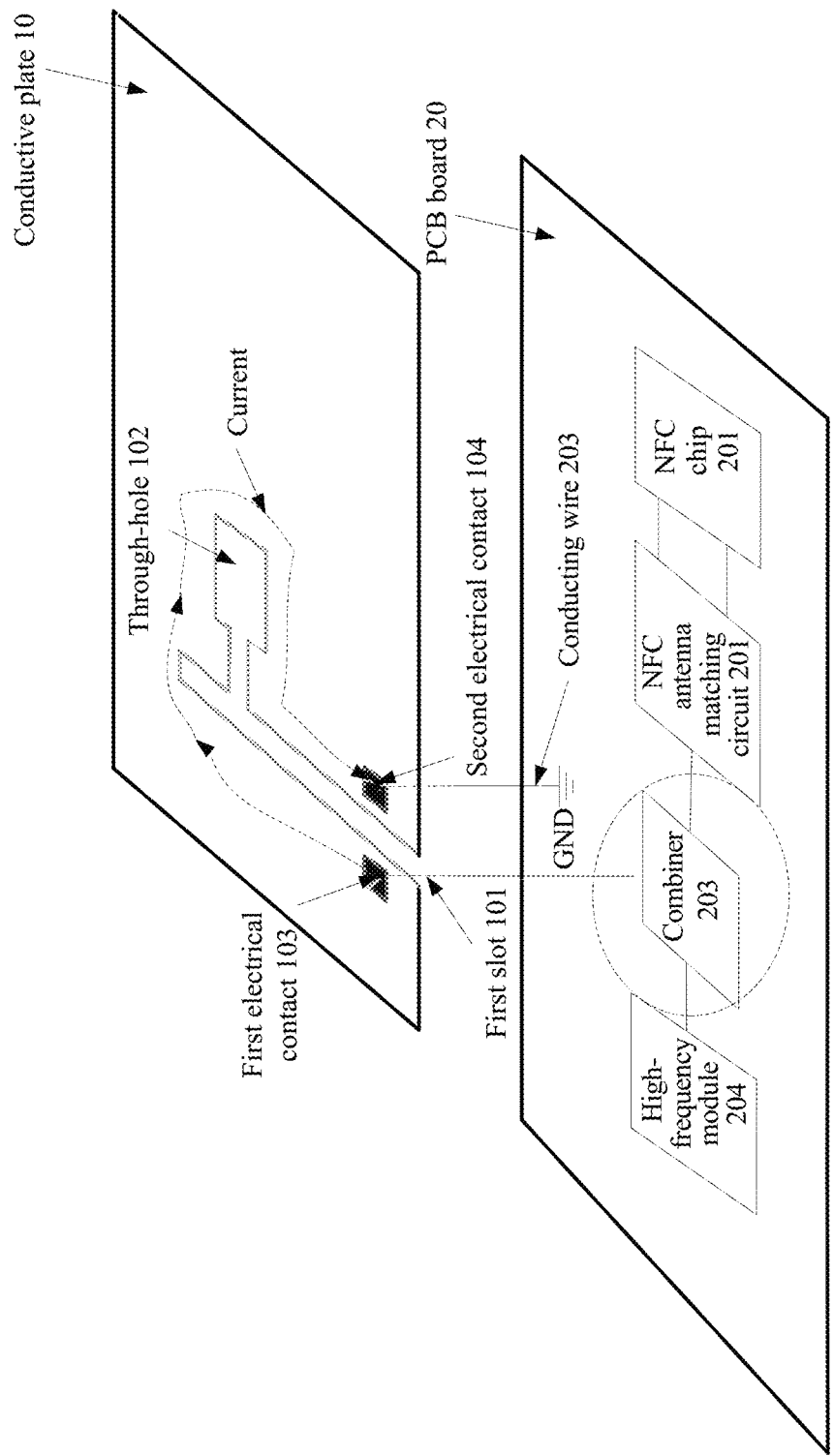
FIG. 11A and FIG. 11B are schematic structural diagrams illustrating that an NFC antenna and a high-frequency antenna share a feeding end according to an embodiment of the present invention.
Figure 11B:
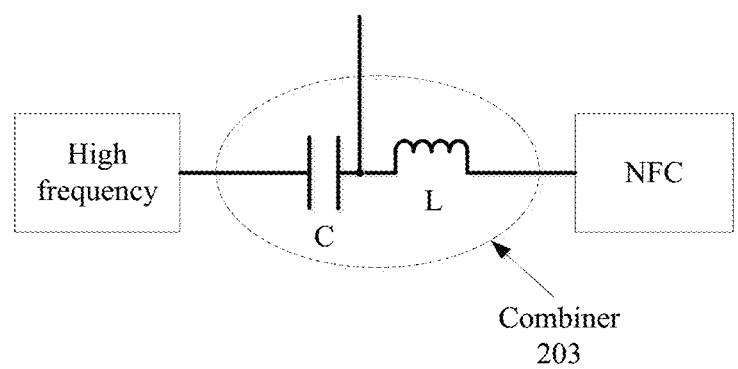

For example, as shown in FIG. 11A, a non-NFC high-frequency module 204 and an NFC module (including the NFC antenna matching circuit 201 and the NFC chip 202) may share the first electrical contact 103 as a shared feeding end of the antenna by using a combiner 203. Specifically, FIG. 11B shows a schematic circuit of the combiner 203. An inductor L has a large inductance, used to conduct a low-frequency signal (an NFC signal with 13.56 MHz) and block a high-frequency signal (higher than 700 MHz). A capacitor C is used to conduct a high-frequency signal and block a low-frequency signal.

In actual application, to make multiple high-frequency modules working at different frequencies share a feeding end with the NFC module, the multiple high-frequency modules with different frequencies and the NFC module may be connected to a shared feeding end (for example, the first electrical contact 103) by using a frequency-selective circuit.

In conclusion, according to the terminal device provided in this embodiment of the present invention, the metal rear cover (that is, the conductive plate 10) of the terminal device can be used as the NFC antenna, so that during design of the terminal, space occupied by the NFC antenna and costs are reduced.

A person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A terminal supporting near field communication, comprising:
a printed circuit board including a near field communication antenna matching circuit and a near field communication chip; and
a conductive plate coupled to the printed circuit board, wherein the conductive plate includes:
a first slot having two sides and an open end;
a through-hole opened to a first side of the first slot; and
a first electrical contact and a second electrical contact being disposed by the two sides of the first slot and disposed between the open end of the first slot and the through-hole, wherein at least one of the first electrical contact or the second electrical contact is coupled to the near field communication antenna matching circuit, and
wherein a current corresponding to a near field communication frequency is formed at a periphery of the first slot and at a periphery of the through-hole.

2. The terminal of claim 1, wherein the first electrical contact and the second electrical contact are symmetrically disposed on the two sides of the first slot.

3. The terminal of claim 1, wherein both the first electrical contact and the second electrical contact are adjacent to the end of the first slot.

4. The terminal of claim 1, wherein the through-hole is configured to place a camera of the terminal or a fingerprint recognition button of the terminal.

5. The terminal of claim 1, wherein a plurality of through-holes is disposed in the conductive plate, and all the through-holes communicating with the first slot from a same side of the first slot.

6. The terminal of claim 1, wherein a plurality of through-holes is disposed in the conductive plate, and the through-holes communicating with the first slot from the two sides of the first slot.

7. The terminal of claim 1, wherein the near field communication antenna matching circuit comprises a first feeding end and a second feeding end, the first feeding end being coupled to the first electrical contact, and the second feeding end being coupled to the second electrical contact.

8. The terminal of claim 7, wherein a manner of coupling the first feeding end to the first electrical contact comprises that the first feeding end is coupled to a third electrical contact, the third electrical contact being disposed on a metal bar, the third electrical contact and the first electrical contact being disposed on the two sides of the first slot, a non-metal area being disposed between the metal bar and the conductive plate, the metal bar being coupled to the first electrical contact using an electrical coupling line, and the electrical coupling line being across the non-metal area.

9. The terminal of claim 1, wherein the near field communication antenna matching circuit comprises a feeding end, one of the first electrical contact or the second electrical contact being coupled to the feeding end, and the other of the first electrical contact or the second electrical contact being grounded.

10. The terminal of claim 9, wherein a manner of coupling one of the first electrical contact or the second electrical contact to the feeding end comprises that the feeding end is coupled to a third electrical contact, the third electrical contact being disposed on a metal bar, the third electrical contact and the first electrical contact being disposed on the two sides of the first slot, a non-metal area being disposed between the metal bar and the conductive plate, the metal bar being coupled to the first electrical contact using an electrical coupling line, and the electrical coupling line being across the non-metal area.

11. The terminal of claim 1, wherein the first electrical contact comprises at least two adjacent conductive components arranged in parallel.

12. The terminal of claim 1, wherein the second electrical contact comprises at least two adjacent conductive components arranged in parallel.

13. The terminal of claim 1, wherein the conductive plate further includes a groove disposed along a line that lies across the conductive, plate wherein the first slot is disposed along the line, wherein a length of the groove corresponds to a length of a portion of the line that is not spanned by the first slot, wherein a depth of at least a portion of the groove is less than a thickness of the conductive plate, and wherein the groove and the first slot is filled with a same insulation material.

14. The terminal of claim 1, wherein the conductive plate is a rear cover of the terminal.

15. The terminal of claim 1, wherein the conductive plate is a metal accessory attached on a rear cover of the terminal.

16. The terminal of claim 1, further comprising an insulation layer, and the insulation layer being located between the conductive plate and the printed circuit board.

17. The terminal of claim 1, wherein the first slot is in a bent shape.

18. The terminal of claim 1, wherein the conductive plate further comprises a second slot, and the second slot being in a bent shape.

19. The terminal of claim 1, wherein the conductive plate is disposed above the printed circuit board.

20. The terminal of claim 1, wherein the terminal is a mobile phone.

* * * * *

UNITED STATES PATENT AND TRADEMARK OFFICE
CERTIFICATE OF CORRECTION

PATENT NO. : 10,916,834 B2
APPLICATION NO. : 16/304985
DATED : February 9, 2021
INVENTOR(S) : Shuwen Lyu et al.

Page 1 of 1

It is certified that error appears in the above-identified patent and that said Letters Patent is hereby corrected as shown below:

In the Claims

Claim 13, Column 12, Line 27: "conductive, plate" should read "conductive plate,"

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*